(12) United States Patent
John et al.

(10) Patent No.: US 9,569,064 B2
(45) Date of Patent: Feb. 14, 2017

(54) SYSTEM AND METHOD FOR A PARTICLE SYSTEM BASED USER INTERFACE

(75) Inventors: Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 174 days.

(21) Appl. No.: 13/170,801

(22) Filed: Jun. 28, 2011

(65) Prior Publication Data
US 2013/0007604 A1   Jan. 3, 2013

(51) Int. Cl.
*G06F 17/00* (2006.01)
*G06F 3/0481* (2013.01)
*G06F 3/0488* (2013.01)
*G06F 3/0482* (2013.01)
*H04N 21/422* (2011.01)
*H04N 21/431* (2011.01)
*H04N 21/442* (2011.01)
*H04M 1/725* (2006.01)

(52) U.S. Cl.
CPC ......... *G06F 3/04812* (2013.01); *G06F 3/0482* (2013.01); *G06F 3/0488* (2013.01); *H04N 21/422* (2013.01); *H04N 21/431* (2013.01); *H04N 21/44222* (2013.01); *H04M 1/72586* (2013.01); *H04M 2250/22* (2013.01)

(58) Field of Classification Search
CPC .............................. G06F 3/04817; G06F 3/048
USPC ........................................................ 715/255
See application file for complete search history.

(56) References Cited

U.S. PATENT DOCUMENTS

| | | | |
|---|---|---|---|
| 5,420,975 A * | 5/1995 | Blades et al. ................ | 715/811 |
| 5,852,440 A * | 12/1998 | Grossman et al. ........... | 715/811 |
| 6,335,737 B1* | 1/2002 | Grossman et al. ........... | 715/719 |
| 6,401,096 B1* | 6/2002 | Zellweger ..................... | 707/702 |
| 7,814,434 B2* | 10/2010 | Nakashima ................... | 715/811 |
| 7,895,530 B2* | 2/2011 | Leavitt et al. ................ | 715/810 |
| 8,151,217 B2* | 4/2012 | Lin ............................... | 715/847 |
| 2003/0220091 A1* | 11/2003 | Farrand et al. ............ | 455/404.1 |
| 2004/0117727 A1* | 6/2004 | Wada ............................ | 715/500 |
| 2007/0070038 A1* | 3/2007 | Hoffberg et al. ............. | 345/156 |
| 2008/0010041 A1* | 1/2008 | McDaniel ............... | G06F 17/50 703/1 |
| 2008/0307359 A1* | 12/2008 | Louch ................... | G06F 3/0481 715/835 |
| 2009/0183120 A1* | 7/2009 | Ording ................. | G06F 3/04842 715/823 |
| 2009/0307623 A1* | 12/2009 | Agarawala .......... | G06F 3/04815 715/765 |
| 2010/0169832 A1* | 7/2010 | Chang .......................... | 715/811 |
| 2011/0029927 A1* | 2/2011 | Lietzke et al. ................ | 715/835 |

* cited by examiner

*Primary Examiner* — Mustafa Amin
(74) *Attorney, Agent, or Firm* — Sheridan Ross P.C.

(57) ABSTRACT

Disclosed herein are systems, methods, and non-transitory computer-readable storage media for simplifying and clarifying user interfaces, both their design and usage. The disclosed system creates and applies rules user options. Upon application of the rules, the system automatically organizes the user options in accordance with the rules, such that the programmer no longer needs to organize every aspect of an options menu and a user can quickly and efficiently choose from the options. Statistics regarding usage and probability are stored to make the options presented more efficient.

20 Claims, 16 Drawing Sheets

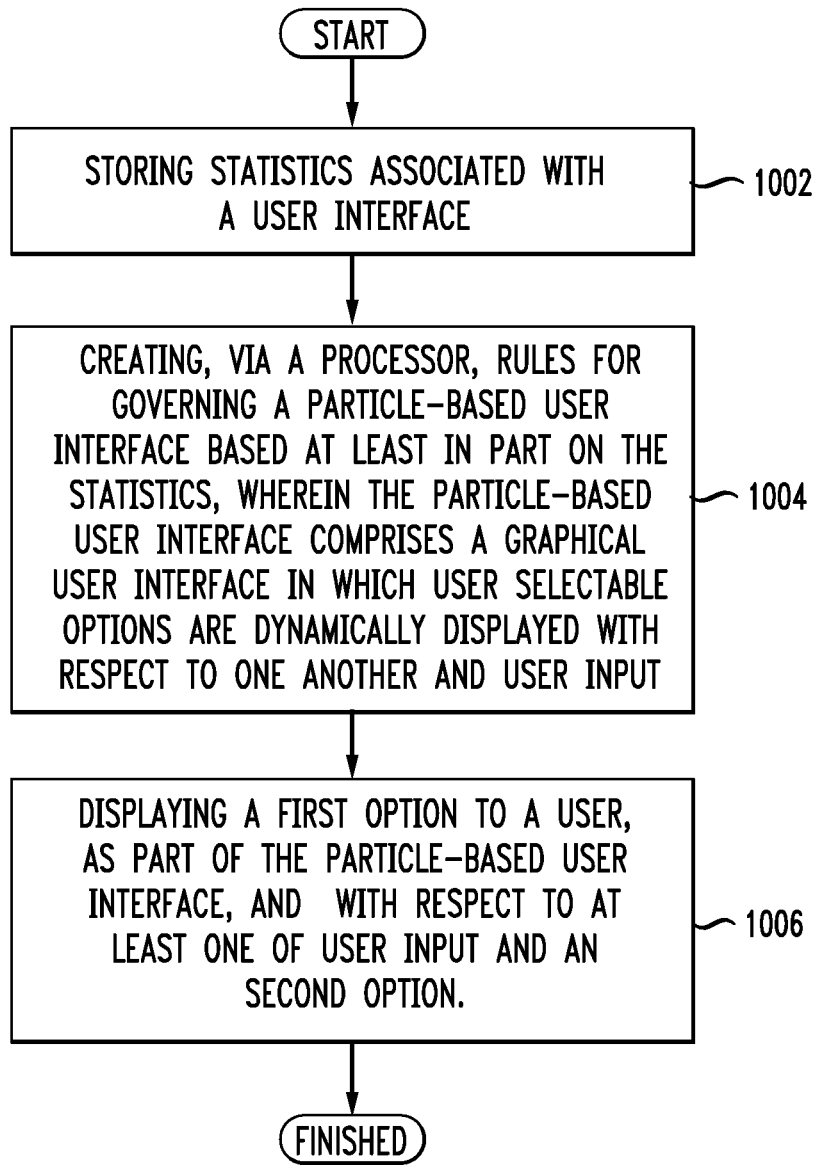

SYSTEM AND METHOD FOR A PARTICLE SYSTEM BASED USER INTERFACE

BACKGROUND

1. Technical Field

The present disclosure relates to user interfaces and more specifically to a particle system graphical user interface.

2. Introduction

As options and intricacy increase in graphical user interfaces, the need for simplicity and clarity in making selections becomes ever more important. User interface design improves by minimizing the time required to view information and make a selection from a variety of options. In static user interfaces, such as restaurant menus or car dashboards, this improvement process proceeds iteratively with each new version or model becoming slightly more user friendly. For example, in recent years the speedometer located in dashboards has become much more prominent, readable, and central to the driver than previous designs.

In dynamic user interfaces, where the information and options available to the user change, the desire for simplicity and clarity continues to apply. The most common type of dynamic user interface, a Graphical User Interface (GUI), uses computer software to determine what the user sees, and often shows user input while making these decisions. As the user proceeds to provide input, the options displayed change in accordance with the user's actions.

For example, common word processing programs have options for saving files, copying text, changing views, and other formatting options. While a select few commands have keyboard shortcuts, many options are only accessible through the menu options located at the top of the GUI. These options are static within the menu, allowing users to remember the locations and become proficient in accessing specific options. A disadvantage of this system is that options are located in menu systems separate from the text, requiring one to divert attention from the text of the word processing program to the menu system.

Similar disadvantages appear in GUI portions of computer operating systems or television menus. The options presented to the user, while changing in response to user action, are located in fixed positions often resulting in inefficient use of the user's time. Attempts to improve this inefficient use of time, such as presenting options for 'recent' files, actions, or channels, nevertheless continue to be located in pre-existing menus lacking improved simplicity and clarity.

SUMMARY

Additional features and advantages of the disclosure will be set forth in the following description, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a particle system user interface. Particle systems allow for easy programming of multiple factors simultaneously influencing visual effects in computer graphics. A particle system simulation models gravity, drag, creating the particles, applying the forces (attractions and springs), and moving the simulation iteratively frame by frame. A particle is represented by a graphical element, which, when combined with other similar particles, can create realistic visualizations of fuzzy objects like smoke, fire, fog, flocks of birds, and insects. Particles can themselves be particle systems. Each particle has attributes and dynamics that can be assigned procedurally. The animation of a particle system is achieved by computing location, and various attributes for each frame. A particle system applies rules governing the interactions of many particles. These rules can emulate real world rules such as gravity, physics, attraction, and repulsion, and influence each particle separately, and thus the behavior of the particle system can be based at least partially on modeling physics. For example, the location of a particular particle is computed based on its velocity which is in turn computed by modeling gravity, attractions to other particles, collisions, and springs. For example, a particle system modeling smoke would initially position the particles in the fire and apply a negative gravity so that they would move from a fire A to the sky B. While there could exist several rules governing the system, one rule could control the density of the particles as they move from A to B, causing the particles to be displayed densely at the fire and dispersing as they approach the sky. One advantage of particle systems is that changing the overall appearance of a particle system only requires a programmer to modify the rules and the specific factors associated with types of particles, after which the programming animating the particle system will update each particles graphical attributes and render them accordingly. The particle based user interface can model and graphically depict non-rigid dynamic objects as opposed to traditional, rigidly positioned user interface elements. Thus the modeling of very complex systems can be expressed very succinctly by specifying various attributes. If a thicker slower moving smoke is desired a programmer need only tweek values specifying the age of a particle, mass, and the rate at which it becomes more transparent. Adding an effect of wind can be achieved by introducing moving invisible attractor particles that in effect pull the smoke particles towards them. Thus, the programmer's job is simplified, she does not have to map out all these behaviors explicitly, but instead can achieve a wide range of effects by modifying particles, rules and properties.

Disclosed is a particle system architecture applied to a user interface. In one embodiment, user selectable options such as 'File', 'Edit', 'Save', 'Copy', etc., are modeled as particles in a particle system rendered with a set of properties and rules. Whereas these options classically were located in static positions at the top of a document editor or browser, they now appear in a dynamic fashion based at least in part on the locations of other user selectable options and the cursor. Statistics based on past use and the probability of future use help determine which user selectable options are displayed. The system then applies the rules and dynamically adjusts the locations of the user selectable options displayed. Because user selectable options are presented dynamically, as particles reacting to the location of other user selectable options and other particles in the system, a programmer only needs to define the user selectable options and create rules defining how those user selectable options interrelate. After the initial definitions, displayed user selectable options self-organize without further need for user or programmer direction. In another aspect, as the user provides input, that input can be reacted to as a particle, which in turn causes the system to readjust and recalculate the positioning of the user selectable options. Once the user input forms a selection, additional user selectable options can be displayed in a similar manner. Yet another aspect uses statistics to make those user selectable options calculated to be most relevant to the user the most accessible to the user input, thereby saving time for the user.

The user can provide explicit input via touch, gesture, mouse events, video input, audio commands, on-screen or physical button presses, and so forth. The user can provide input indirectly via presence information, device state, environmental state (noise levels, position, orientation, etc.), and so forth. The user can provide input via a camera such as a webcam or the Xbox Kinect accessory, a microphone, tablet computing device, and so forth.

One example method implements a particle-based user interface system that stores statistics associated with the user interface. These statistics can be of previous interactions or can represent the probability of future events. In some instances, these statistics can only contain option hierarchy information, rather than usage or probability data. Upon recording the statistics, the system creates rules governing the user interface and controlling the display of user selectable options by dynamically adjusting the user selectable options with respect to one another and/or user input. These rules can make further user interface adjustments based on previously recorded statistics. Having defined rules, the system displays at least one user selectable option which adjusts according to the rules. These adjustments occur with respect to at least one of user input and other options. For instance, having multiple selectable options close to one another could cause them to adjust, per the rules, and move away from one another. Other exemplary ways the user selectable options, acting as particles, can adjust besides position include size, color, emphasis, and transparency. As the user provides input the user selectable options will continue to dynamically adjust according to the rules.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 10 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The present disclosure addresses the need in the art for increased simplicity and clarity in programming and interacting with Graphical User Interfaces (GUIs). A system, method and non-transitory computer-readable media are disclosed which create a particle-based user interface. A brief introductory description of a basic general purpose system or computing device in FIG. 1A which can be employed to practice the concepts is disclosed herein. FIG. 1B and FIG. 1C will illustrate an example of a particle system being implemented into a word processor program. A more detailed description of particle-based user interfaces will then follow accompanied with variations discussed herein as the various embodiments are set forth. The disclosure now turns to FIG. 1A.

Figure 1A:
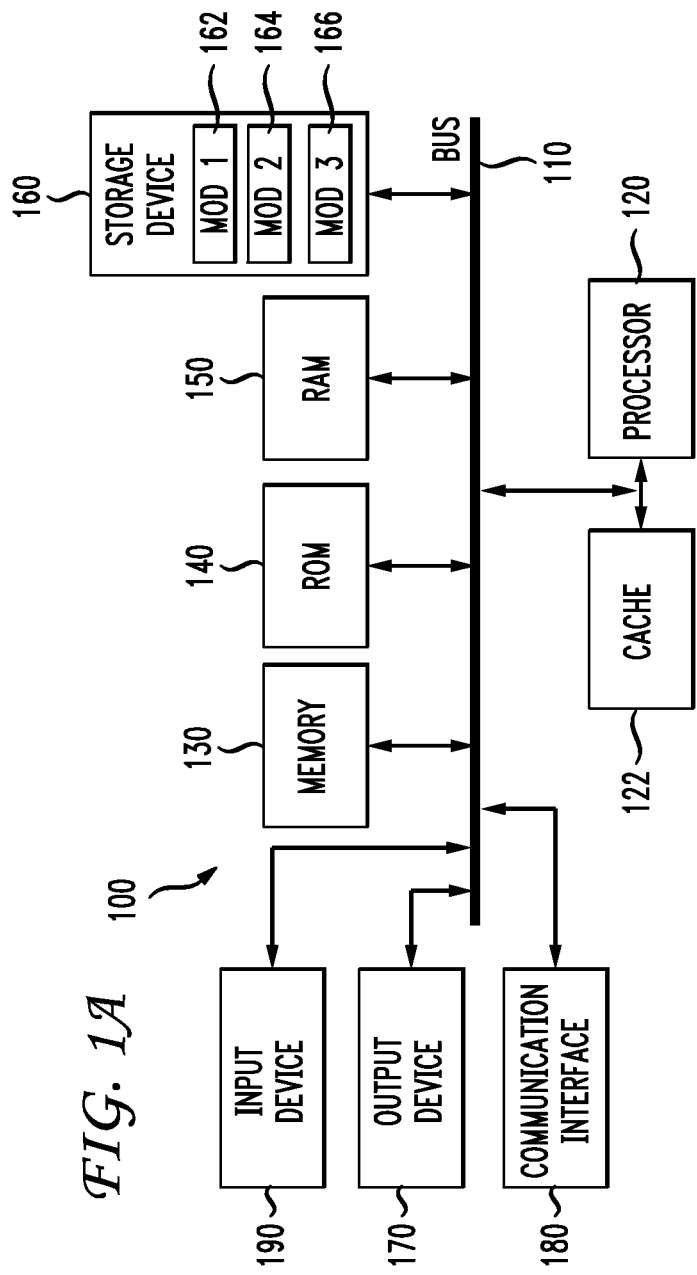
FIG. 1A illustrates an example system embodiment.
Figure 1B:
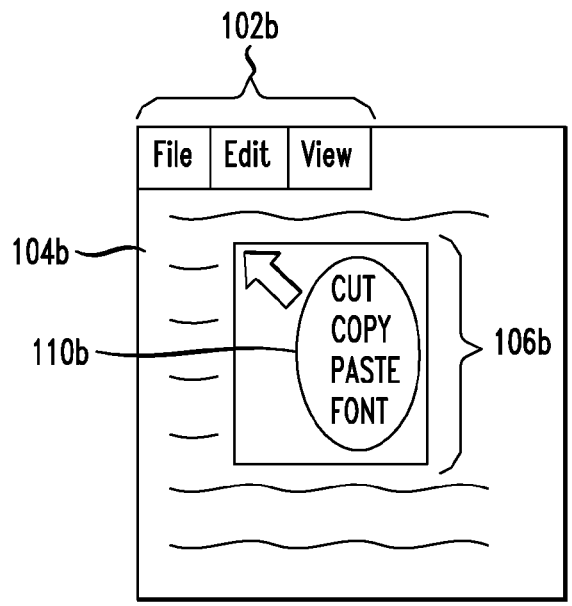
FIGS. 1B and 1C illustrate a word-processor conversion to a particle system.
Figure 1C:
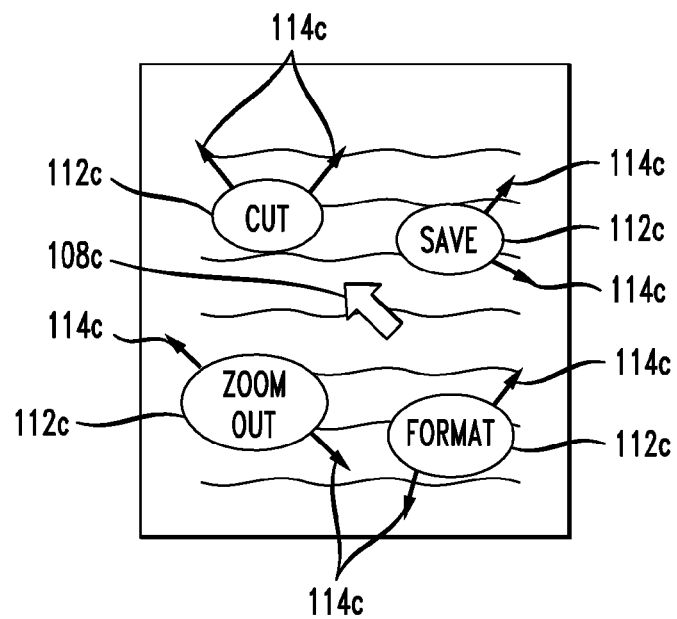

With reference to FIG. 1A, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for voice input, a touch-sensitive screen for gesture or graphical input, keyboard, mouse, motion input, and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1A may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure turns to an example of a particle-based user interface. FIG. 1B illustrates a typical word processing program when a right mouse button is clicked. The program has text 104b which the user is writing or editing and menu options 102b located at the top of the screen. At the location where the user clicked the right button of the mouse 108b a menu 106b has appeared containing several options 110b, such as cut, copy, paste, and font. In this non-particle-based system, the menu options 102b are fixed at the top of the screen, such that if a user wanted to access those options using a mouse they must move the mouse to the top of the screen. Similarly, the options available upon right clicking are fixed, such that the user can only perform the actions predetermined by a programmer.

FIG. 1C illustrates an example of a word processor upon implementing a particle-based user interface. The menu options at the top of the screen are gone, replaced by a larger text window. Upon right clicking with the mouse, the cursor 108c is surrounded by options 112c acting as particles. The options displayed are governed by statistical data determining which are most likely to be used by the user in the current context. In this instance, the options 112c are cut, save, zoom out, and format. Each of these options can move in accordance with the system rules, the movement being indicated by the arrows 114c.

Having disclosed some components of a computing system, the disclosure turns to implementation of particle-based user interfaces. A particle-based system has one or more individual particles. Each of these particles has attributes that directly or indirectly affect the particle behavior or how and where the particle is rendered. Such systems provide excellent models for real world particle interaction because they can emulate real-world particle behavior. For example, a particle system emulating gravitational attraction of molecules can define masses for each molecule in the system, and a rule governing the system, where the rule takes the form of Newton's law of universal gravitation $$F = G\frac{m1 m2}{r^2},$$

where F is the attraction force, G is a gravitational constant, m1 and m2 are the molecular masses and r represents the distance between the molecules. Upon running such a particle-based system, the molecules displayed will begin to move closer and closer while emulating gravity. Because this example lacks any rule governing repulsion and is a closed model, eventually all displayed particles would group together. Springs can model how some particles are connected or associated with each other, how particles move as a function of one another, and how forces like gravity affect them, if at all. Springs can also be used to maintain distance between objects.

Particle systems are often used to simulate smoke, fog, flocks of birds, and molecules (where entities are "attached" with springs). In each case, rules define the way individual particles interact with other particles based on certain characteristics of each particle. One significant advantage of particle based systems to programmers is the ability to make minor changes to rules or particle characteristics that subsequently modify interactions of every particle, without the labor of redefining every particle interaction individually. As the particle-based system displays particles, the computing system 100 calculates the relationships between every particle. The need to program or otherwise direct particle interaction is unnecessary.

Application of these same concepts to a GUI therefore requires defining or reading attributes of the user options, which then act as the particles in the system. It further uses rules governing the interactions of these options. Having defined the characteristics of the options, and the rules governing them, the system 100 will automatically present and distribute the options in accordance with the rules. Each rule implemented creates a new relationship between each option in the particle-based user interface, and can cause the system to become enormously complex. Moreover, display of the options need not be restricted to two-dimensional formats, but can utilize three-dimensional locations. These three dimensional displays can be quite useful with photo-capture input devices, such as the Microsoft Kinect®. Other types of input, which can in certain embodiments be treated as a particle, can be touchpads, mice, trackballs, touch screens, speech capture, or eye-tracking devices.

While the disclosed particle-based user interface can be used in a wide variety of graphical user interfaces, some exemplary embodiments within the scope of this disclosure include: an operating system, a word processing program, a television menu, and video games. In implementing a particle-based user interface into these systems, the particle-based system can initially emulate a pre-existing, non-particle-based user interface. The particle-based interface can then adapt over time to ease the user into using a particle-based system. This adaption can occur by recording statistical information about what options the user selects, when they select them, cursor location prior to making the selection, order of selection, and other such useful information. The system 100 then modifies the displayed options with the goal of making access to those options faster and more intuitive for the user.

For example, if someone has been playing a computer game for a significant amount of time, that user can already have the location of every option memorized. If a particle-based system were implemented it could slow them down sufficiently that they would lose their proficiency in the game. However, by having the particle-based system emulate the original non-particle-based user interface and adapt over time, the system 100 can determine where the options presented to the user are located such that the user's speed and accuracy in selecting options will be most useful. Moreover, the system 100 can then determine the options used most often and present those to the user in an efficient way.

This customization can be specific to a user, or affect all users of a system. For example, in a television unit shared by a family, each user could have a specific interface system for the way they interact with the system. These interactions could vary depending on how they physically make selection using hand gestures in a photo-capture system or rate of selection if using a controller. The recommendations could also change depending on the user, thereby making the options presented personalized to the user. In each of these situation, stored statistics helps personalize the recommendations, and in certain instances, helps the system 100 recognize the current user.

One aspect of the disclosure is the ability to simplify and clarify user options. Where possible such implementation can occur by reducing the time required to make a selection. In a word processing program this can occur by placing the options immediately around the user's cursor or mouse arrow. If using a photo-capture device, the options can be located near the simulated cursor on the screen.

Another aspect of the disclosure is the ability for the relationships between options to be easily modified. In most embodiments this modification will occur prior to implementation by a programmer. However, in certain embodiments the users will be able to create and modify both rules and characteristics governing the relationships between options. In particular, layered relationships, where options are sub-options of a previously selected option, can need revision and updating. The user can further have the ability to show these sub-options simultaneously with higher-level options or separately. One particle can contain multiple sub-particles, in a hierarchical representation. Thus, a user can drill down into lower levels of a particle and view the sub-particles contained therein.

Figure 2A:
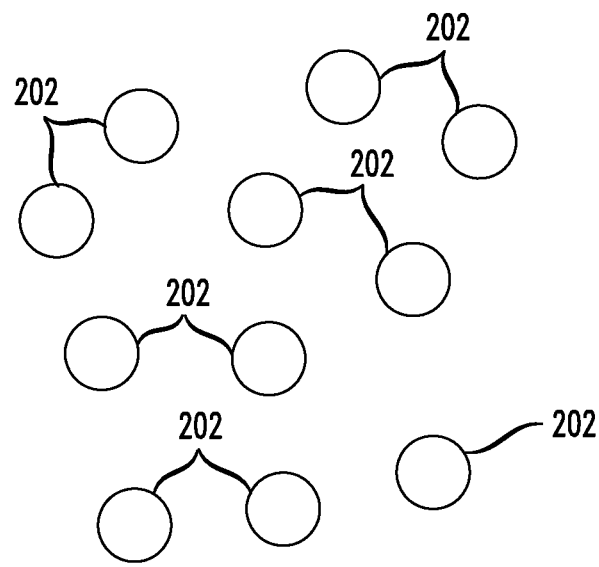
FIGS. 2A, 2B, 2C, and 2D illustrate an example particle system.
Figure 2B:
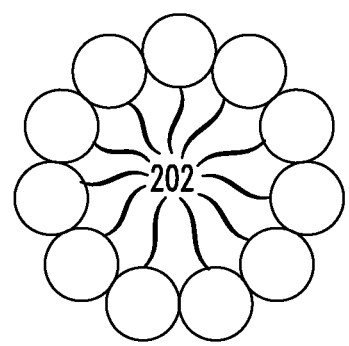

Having disclosed some components of a computing system and details associated with particle-based user interfaces, the disclosure now turns to FIGS. 2A-2D, which illustrate an elementary particle-based system. In FIG. 2A individual particles 202 are shown. These particles 202 are unstructured and free floating, with no rules controlling their positioning. FIG. 2B illustrates these same particles 202 upon implementing at least one rule. Upon implementing the rule, the system 100 analyzes each particle 202 and the relationships between all other particles 202. Here, the particle-based system has arranged all the particles 202 into a circular structure.

Figure 2C:
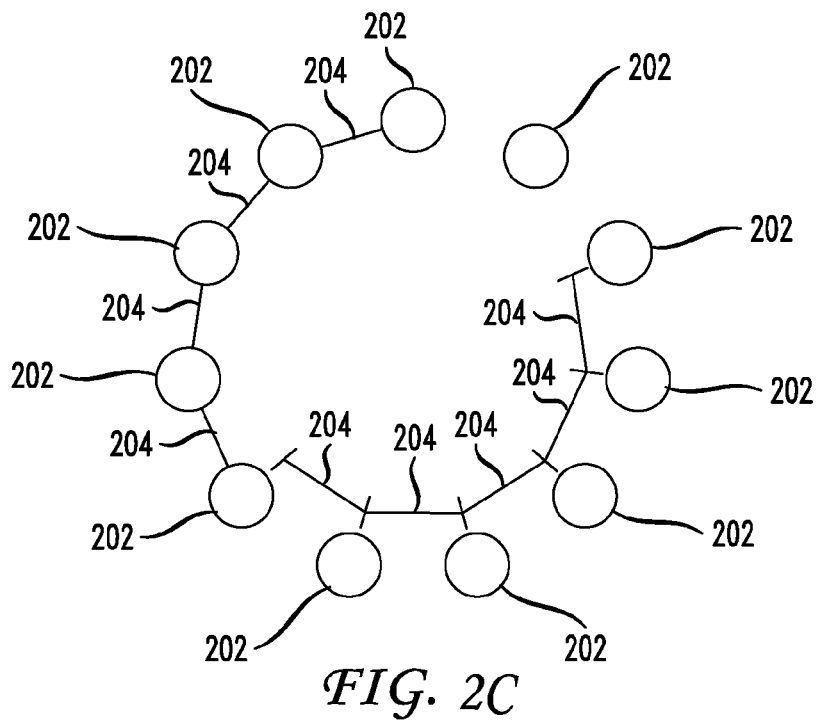
Figure 2D:
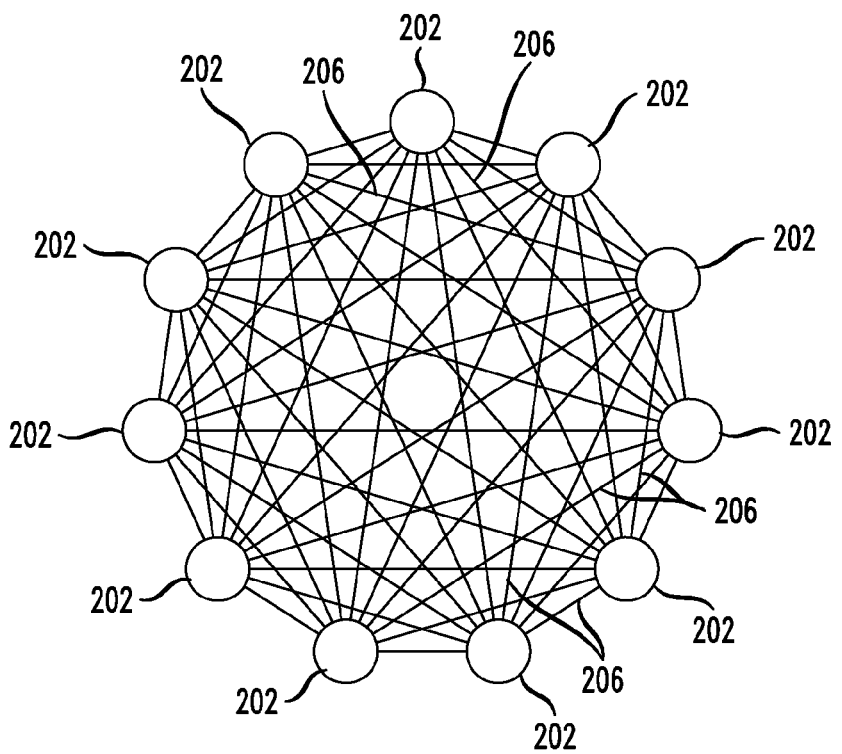

FIG. 2C illustrates these same particles 202 distributed in a different fashion, indicating that different rules are being applied to the particles 202 than were applied in FIG. 2B. Rather than each particle 202 touching two other particles, there is now a gap 204 between the particles 202. FIG. 2D illustrates these relationships 206 between the particles 202. Each particle 202 has a relationship 206 with every other particle. These relationships 206 are defined by rules, which when implemented by the system 100 create a particle-based system. In this example, changing the rules between FIG. 2B and FIG. 2C changed the shape the particles aligned themselves into.

Figure 3A:
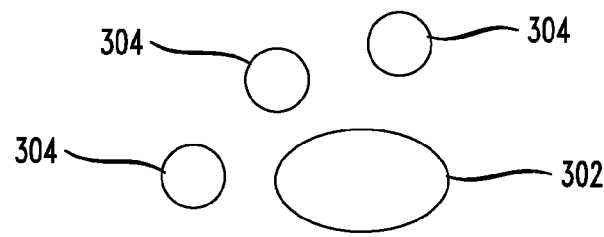
FIGS. 3A, 3B, and 3C illustrate a second example particle system.
Figure 3B:
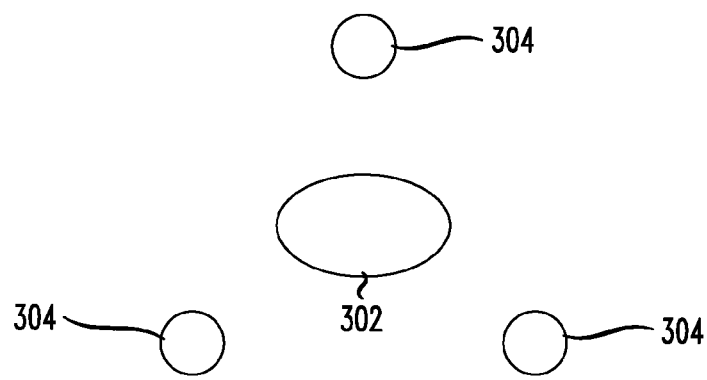
Figure 3C:
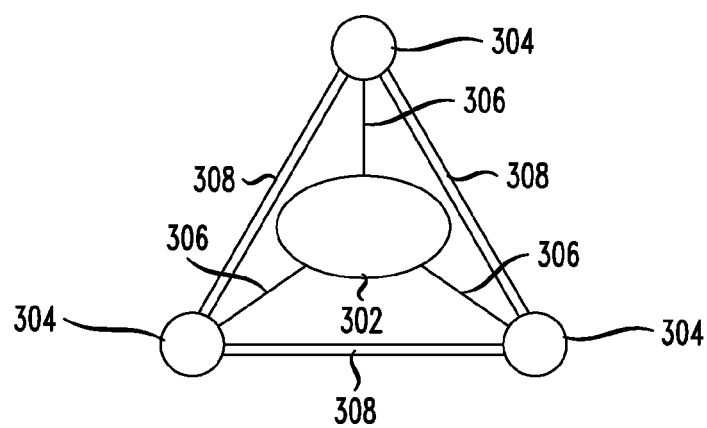

FIGS. 3A, 3B, and 3C illustrate a particle system where the particles have different weights or characteristics. FIG. 3A displays a big particle 302 with several small particles 304 unorganized. Upon implementing a rule, relationships are created which align the smaller particles 304 into an equilateral triangle around the big particle 302, as shown in FIG. 3B. FIG. 3C shows the computational relationships between the big particle 302 and the smaller particles 304. Each small particle 304 has a relationship 306 with the big particle 302, as well as a relationship 308 with the other small particles.

Figure 4A:
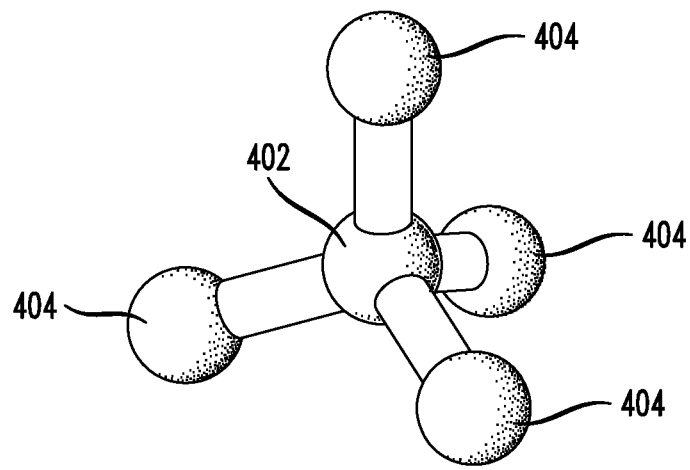
FIGS. 4A and 4B illustrate a three-dimensional particle system.
Figure 4B:
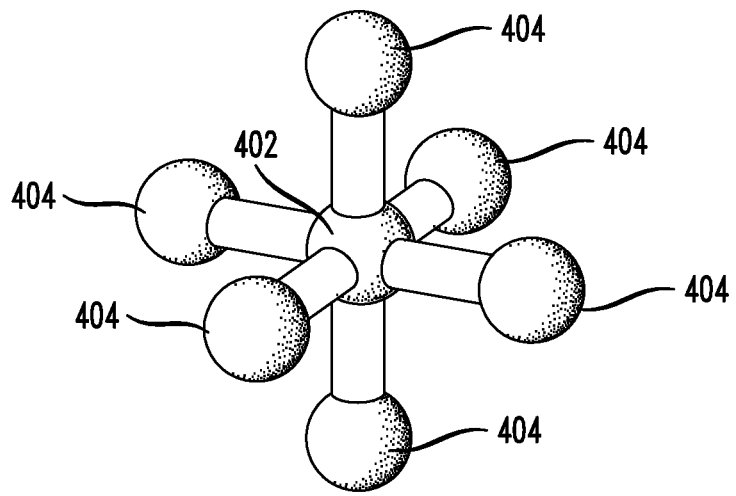

FIGS. 4A and 4B illustrate a particle system in three dimensions, where lower weighted particles 404 surround a higher weighted particle 402. FIG. 4A only has 4 lower weighted particles 404, whereas FIG. 4B has 6 lower weighted particles 404. While the numbers of particles in a system can be quite large, and these are shown only as examples of graphical implementations of particle systems, it should be a point of consideration that too many particles can frustrate a user's ability to make clear and simple decisions.

Figure 5A:
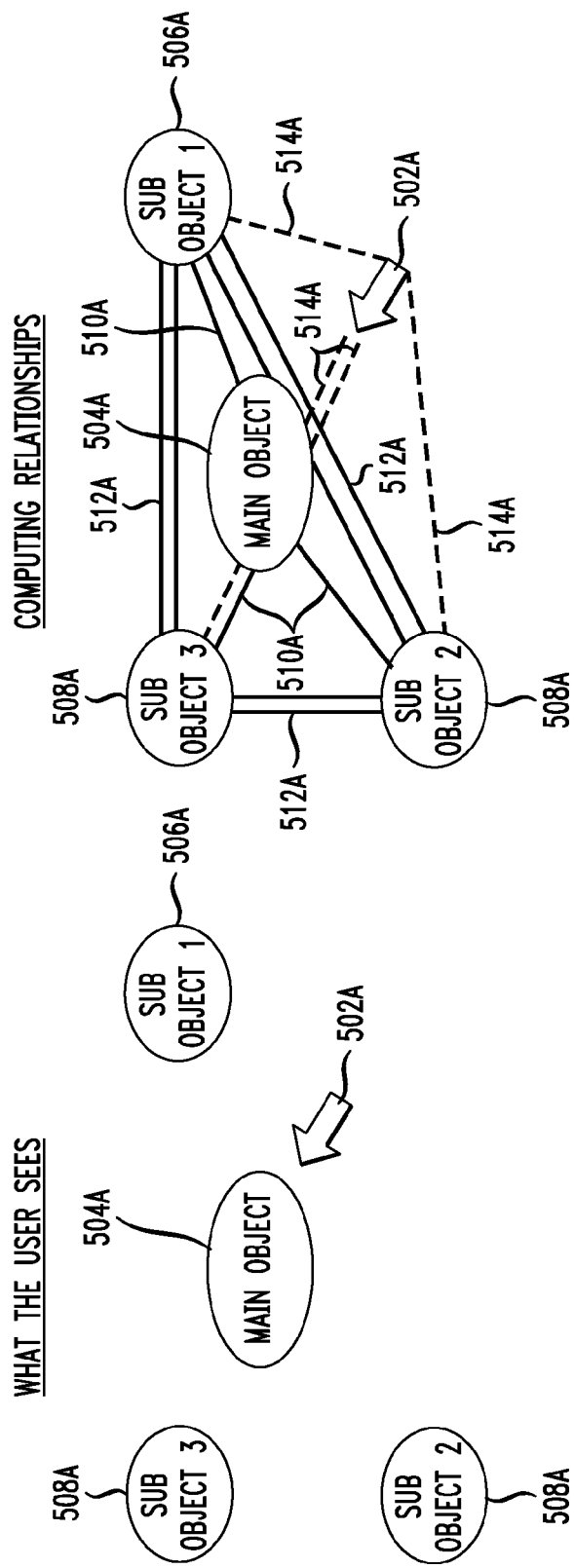
FIGS. 5A and 5B illustrate an example particle-system user interface.
Figure 5B:
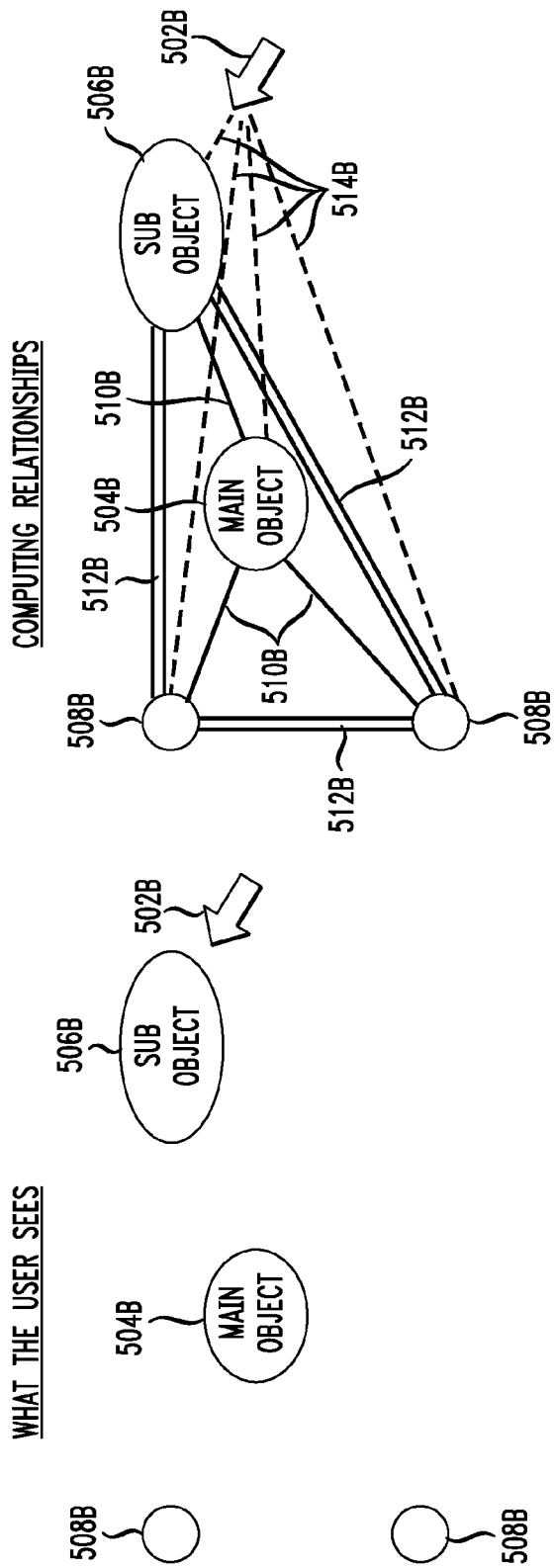

FIGS. 5A and 5B illustrate an exemplary particle-based user interface. Both FIG. 5A and FIG. 5B present two views: a view illustrating what a user would actually see, and a view illustrating the computing relationships defined by the particle-based user interface. In FIG. 5A user selectable options present are a main object 504A and sub-objects 506A, 508A. The user also has a cursor 502A used to select between the objects 504A, 508A. There are also relationships 512A between all the sub-objects 506A, 508A, as well as relationships 510A from the sub-objects 506A, 508A to the main object 504A. In this example, the cursor 502A also has relationships 514A with both the sub-objects 506A, 508A and the main object 504A, creating an interwoven relationship between all components of the particle-based user interface.

FIG. 5B illustrates the same particle-based user interface of FIG. 5A, but after the user has moved the cursor 502B to a new location closer to one of the sub-objects 506B. Upon doing so, the system 100 resizes the size other sub-objects 508B and the main object 504B. To make the resizing modification, the system 100 notes the new position of the cursor 502B with respect to the main object 504B and the sub-objects 506B. The system 100 uses the locations of the objects 504B, 506B and the location of the cursor 502B as it processes the rules governing the particle-based user interface. Each rule is processed based on the locations of the options (particles) and the location of other options or the cursor (particles). As each rule is repeatedly applied the locations or appearances of the options can change.

In FIG. 5B, the changed relationships 510B, 512B, 514B due to the new cursor 502B location the rules have caused the system 100 to change the size of the sub-object 506B next to the cursors new location. This has occurred as the system 100 continuously is processing the rules with respect to each particle displayed. Other variations or embodiments could have rules that maintain the original shape or size of options irrespective of input location, or could change other visualizations such as color, transparency, or fonts associated with the options. Yet another variation of the particle-based user interface shown in FIGS. 5A and 5B could use multiple user inputs in making selections or size change decisions. By using multiple inputs, users could cause the system to rotate, zoom in, zoom out, select multiple items at once, or, in three-dimensional displays, spin the options for better viewing.

Figure 6A:
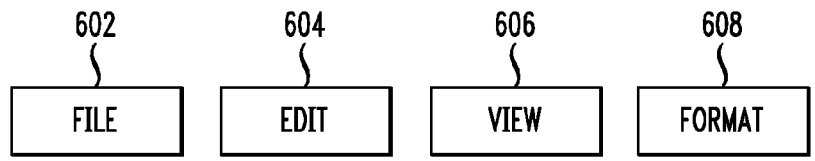
FIGS. 6A, 6B, 6C, and 6D illustrate an example particle-system user interface of a word processor.

FIG. 6A-6D illustrate one exemplary embodiment of a particle-based user interface being implemented into a document manipulation program, such as a word processor or spreadsheet program. FIG. 6A illustrates several standard menus that appear at the top of most document manipulation programs: File 602, Edit 604, View 606, and Format 608. Upon implementing a particle-based user interface, the menu options 602, 604, 606, 608 become particles. The system 100 can then modify these menu particles into new shapes or designs, such as the one shown in FIG. 6B. These shapes can appear in a specific location, such as the top left corner, or can disappear altogether until specific user input (such as a right-mouse click) is received. Shape, location, and other display modifications can be influenced by stored statistics based on user interactions. For example, when typing a document in a word processor program, it rarely is an efficient use of time to divert attention away from the text to move to the menus at the top of the screen. A better use of time would be to have the menu options appear directly around user input. In this example, a user can be typing and hit a shortcut combination, with the menu options appearing directly around the cursor. In the alternative, the user can use a mouse or trackball input to initiate the menus around the mouse cursor. In yet another alternative, if the screen is touch sensitive, the user could simply touch the screen to produce the menu. When the user touches a finger (or other body part) to the touch-sensitive screen, the system can model the user's finger as one particle in the particle-based system. As such, the touch particle can attract, repel, or otherwise influence certain other particles.

Figure 6B:
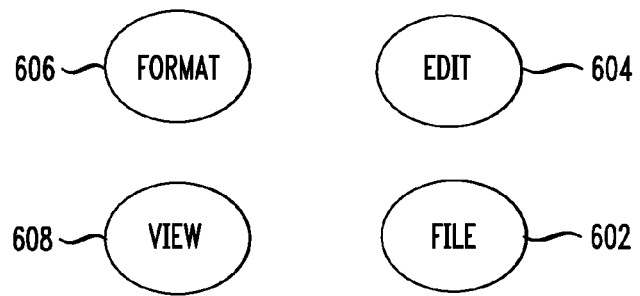
Figure 6C:
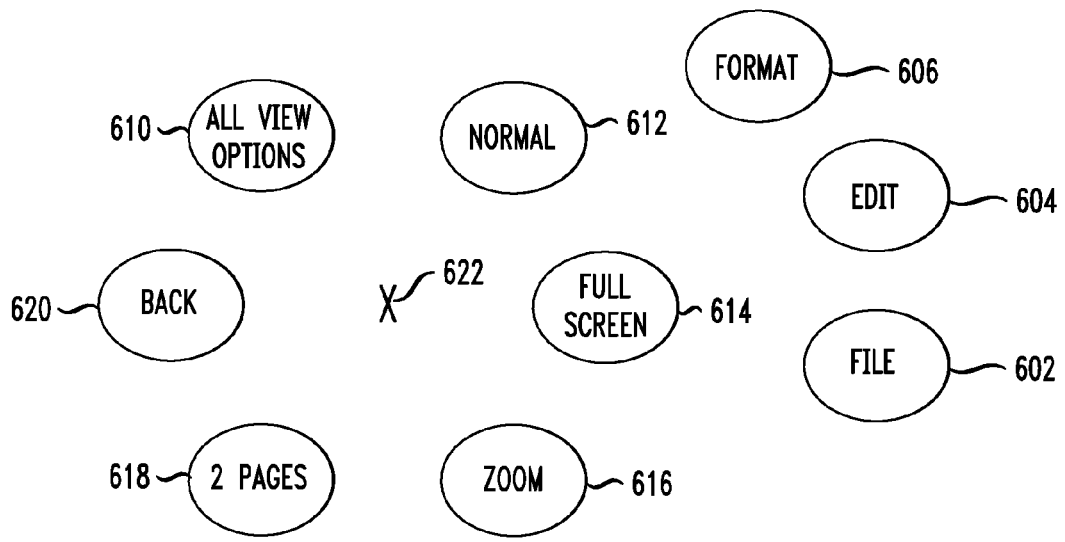

FIG. 6C illustrates the particle-based user interface of FIG. 6B after selecting an option. An X 622 denotes the location of the user input, whether cursor, touch, or otherwise. The user has selected the View 608 option, which has opened into multiple parts. Common view menu options, such as 2 Pages 618, Zoom 616, Full Screen 614, and Normal 612 are listed individually as immediately selectable options. Such options are determined by stored statistical data. These can be predefined to always appear when View 608 is selected by the user, or can reflect specific trends of the user. Such trends can be determined by the system 100 from stored statistical data. The user can also select to have All View Options 610 available or go Back 620 to the previous menu shown in FIG. 6B. Because the view options 610, 612, 614, 616, 618, 620 encircled the input location 622, the options previously available have been pushed out from the input location 622, such that Format 606, Edit 604, and File 602 are now located in new locations.

Figure 6D:
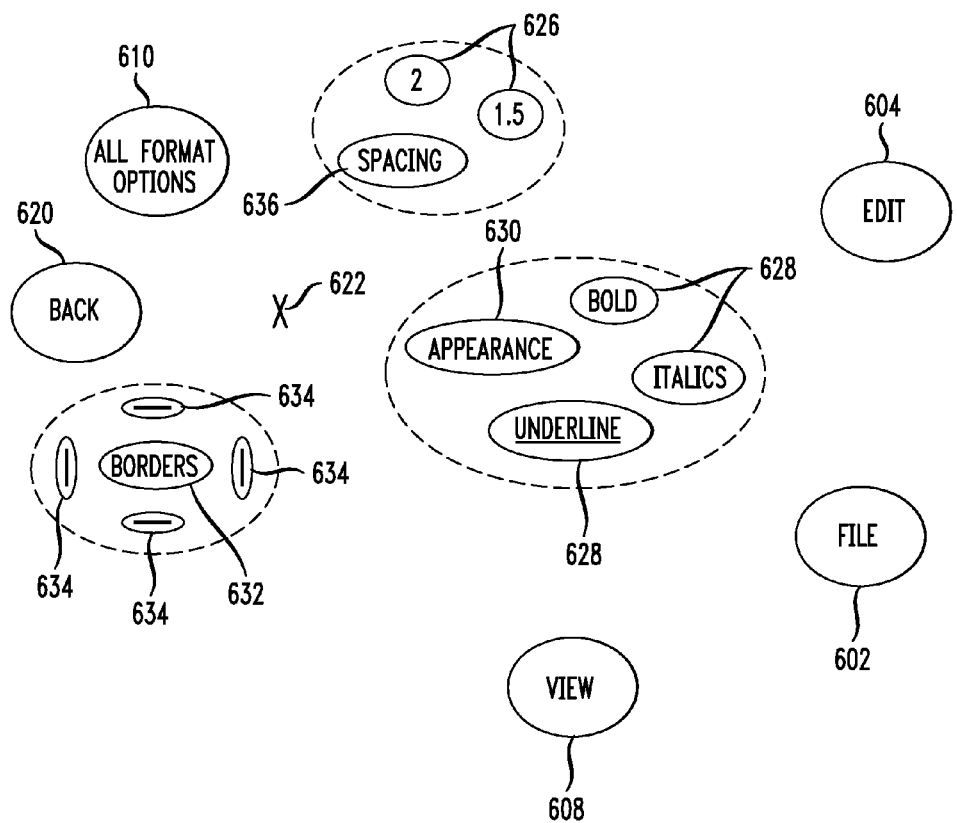

FIG. 6D illustrates the same concept as FIG. 6C, however here the user has selected Format 606 and a wider variety of options is being presented. Similarly to FIG. 6C, the other options of Edit 604, File 602, and View 608 have been pushed out from the input location 622. There are also options to go Back 620 and view All Format Options 610. However, here there are a number of sub-options listed in conjunction with options. For example, the Borders 632 option is surrounded by borders 634. The user can select the Borders 632 option and get a menu for details on borders to add, or can simply select one of the borders 634 surrounding the Borders 632 option. Options for Spacing 636 and setting the spacing to '2' or '1.5' 626 are similarly available, as are common appearance options 628 under an Appearance 630. The dotted lines indicate that these options and sub-options share similar functions and are spaced together with respect to other areas.

Figure 7A:
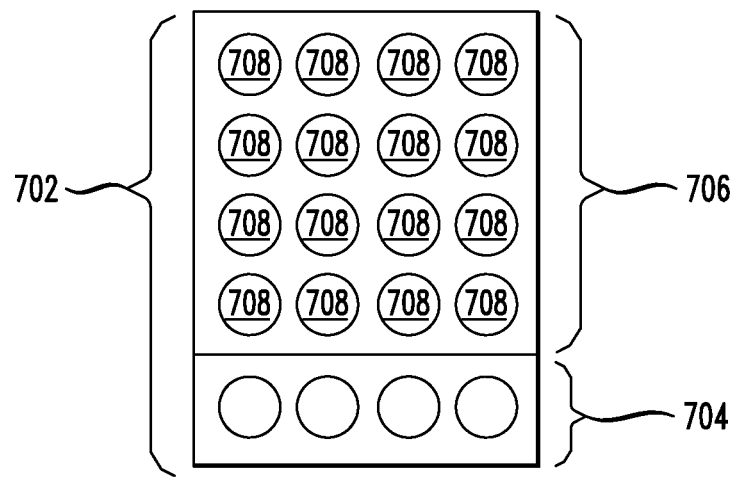
FIGS. 7A, 7B, 7C, and 7D illustrate an example particle-system user interface with a touch-screen interface.
Figure 7B:
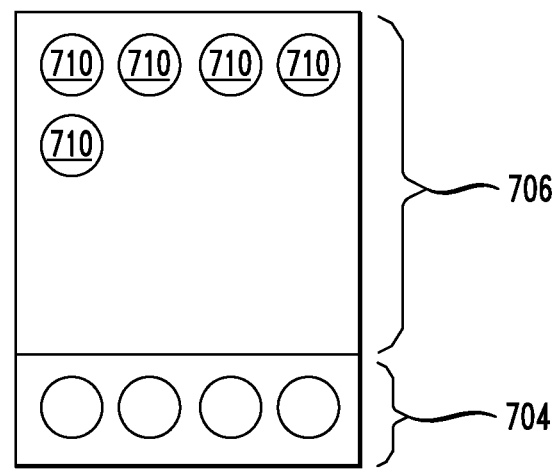

FIGS. 7A-7D illustrate touch-screen input devices, such as tablet computer or smart phones. FIG. 7A illustrates a typical user interface for a smart phone 702, with constant applications being displayed in the bottom portion 704 of the viewing area and changing applications or directories 708 in the top portion 706 of the viewing area. FIG. 7B illustrates an example of a touch-screen input device upon selecting a group or directory. Rather than the top portion 706 being filled with applications or directories, there are now only a select few applications 710. The constant applications remain in the bottom portion 704 of the viewing area.

Figure 7C:
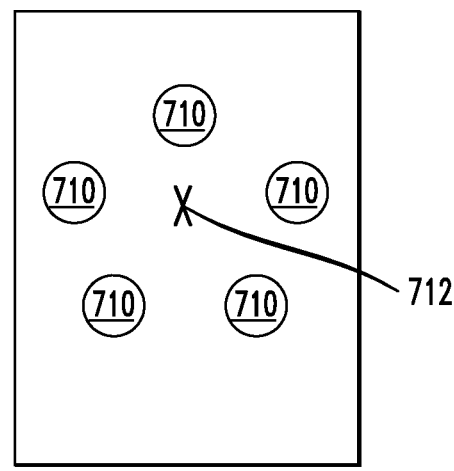
Figure 7D:
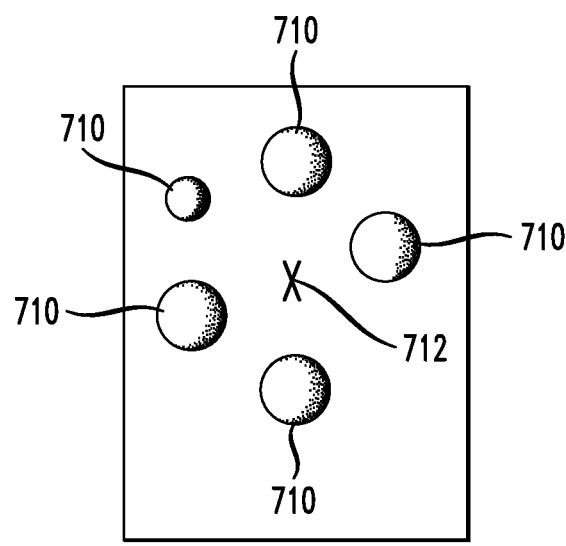

Upon implementing a particle-based user interface system with the touch-screen input, options could appear around the user contact point 712 in a variety of ways. FIG. 7C illustrates a simple 2-dimensional particle-based menu which could replace the sub-directory seen in FIG. 7B. Here the menu options 710 distribute around the user input 712 in an equidistant fashion. In this example the constant options have disappeared, though in other embodiments they could remain. FIG. 7D shows the same menu options 710 in a particle-based user interface, however here the menu options 710 are displayed in a 3-dimensional display. In a 3-dimensional display the user can use multiple inputs 712 to select, rotate, zoom, or otherwise manipulate the display.

Figure 8A:
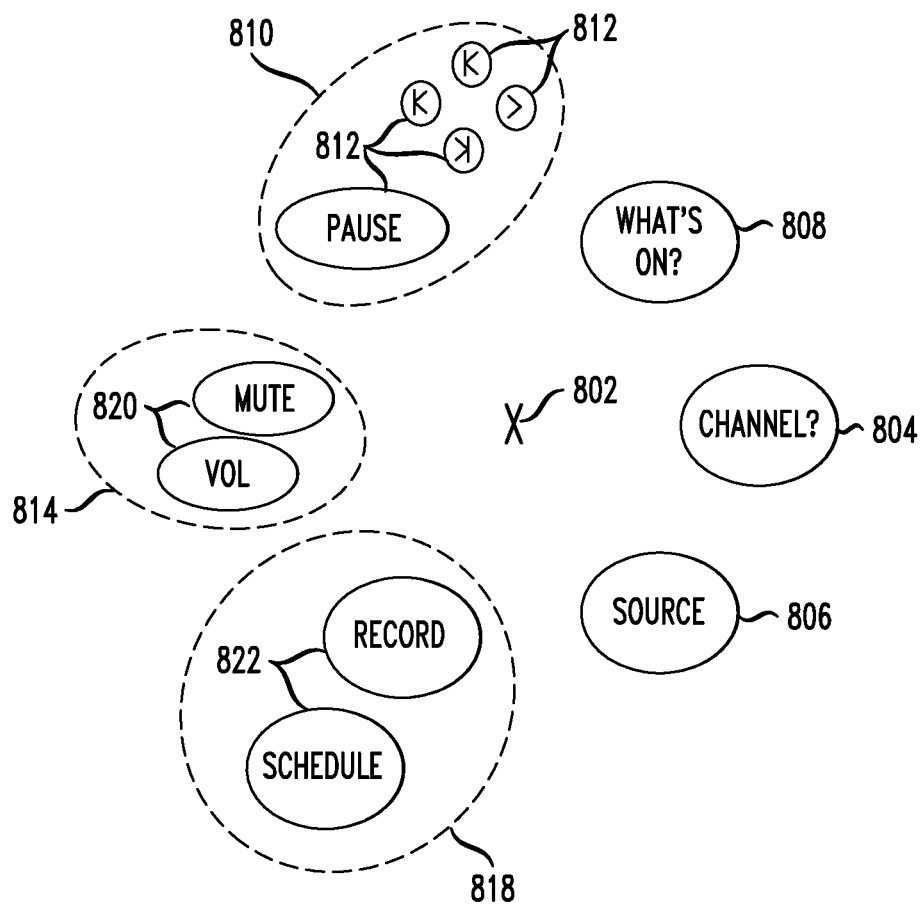
FIGS. 8A, 8B, and 8C illustrate an example particle-system user interface of a television program.
Figure 8B:
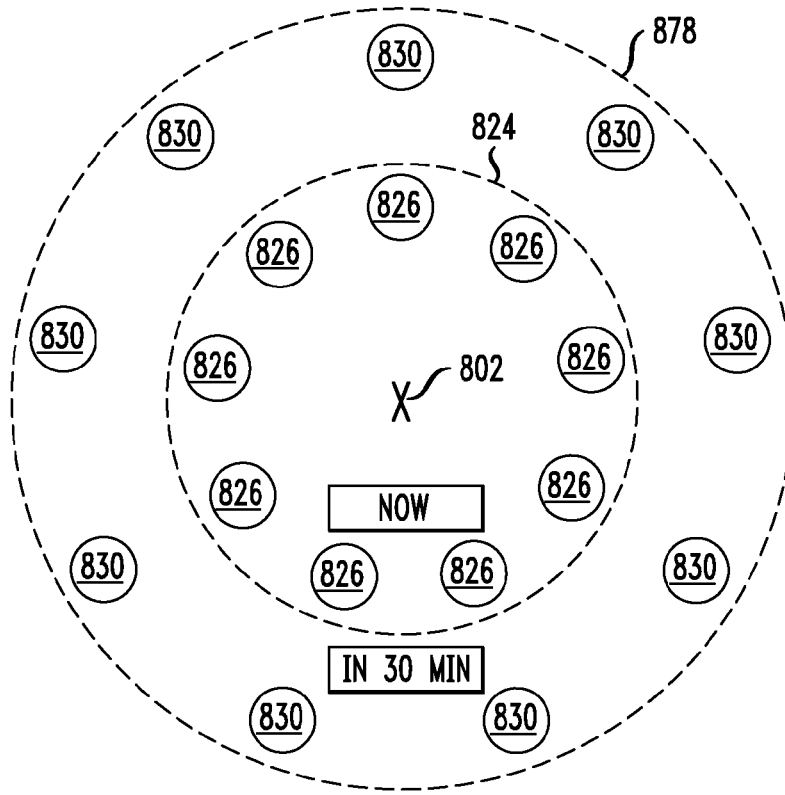
Figure 8C:
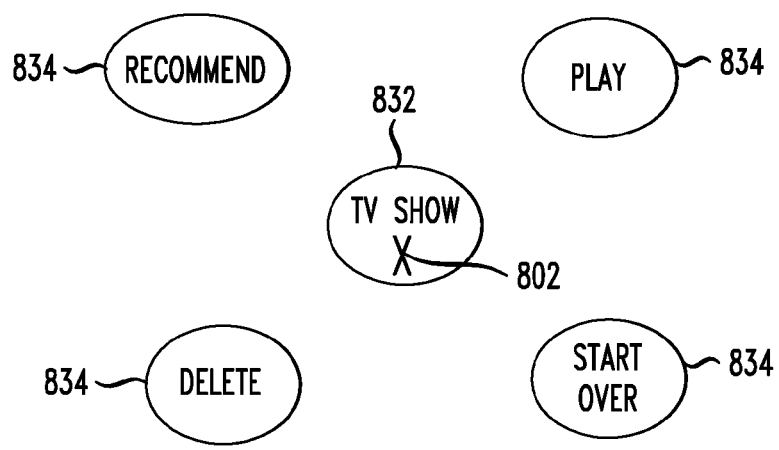

FIGS. 8A-8C illustrate the use of a particle-based user interface to watch television. FIG. 8A contains an example of a menu for television viewing. The user's input 802 is centrally located between a variety of options. The options include What's On? 808, Channel? 804, Source 806, Recording and Scheduling 822, which are combined into a group 618, volume controls 814, including Mute and Volume 820, and the Play/Pause group 610 with individual options 812. The user can then easily reach any of these menu options quickly and efficiently. The system can model groups of UI elements using springs connecting the corresponding particles to change to different arrangements, such as a fan arrangement. The system can change certain properties to depict the particles on an different virtual surface to depict an arc instead of a rectangular surface, for example.

FIG. 8B shows an example of channel surfing using a particle-based user interface. Here the user can choose from programs on now 826, as well as programs on in 30 min 830. These programs 826, 830 are grouped around the user's input 802, and are circularly grouped in to their respective time slots 824, 828 around the user input 802. FIG. 8C illustrates possible user options 834 once a specific television show 832 has been selected. These options 834 include Play, Start Over, Recommend, Delete, but could be customized to the individual user as well.

Figure 9A:
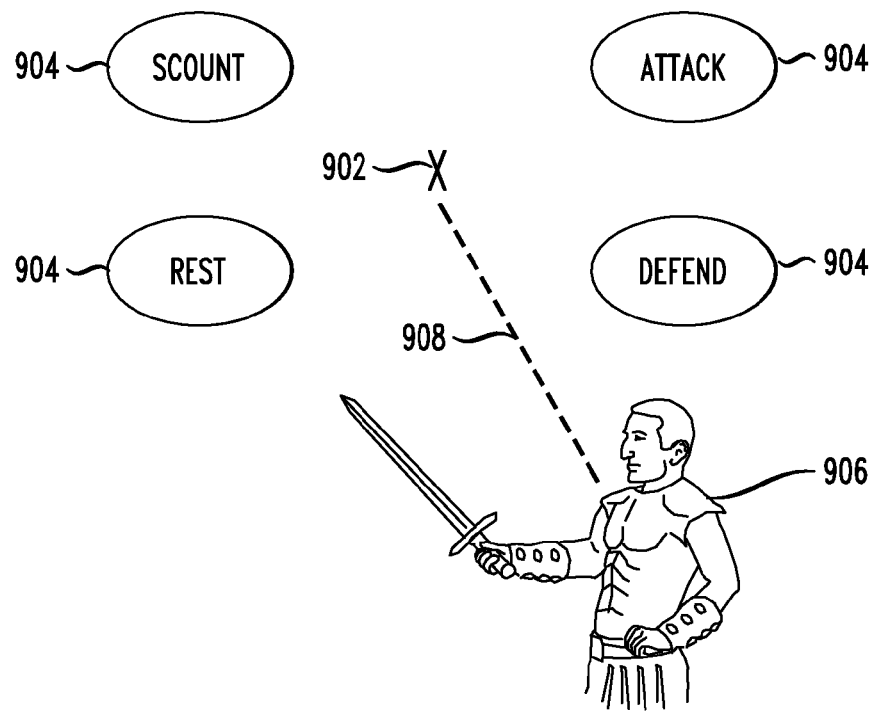
FIGS. 9A and 9B illustrate examples of particle-system user interfaces in computer games.
Figure 9B:
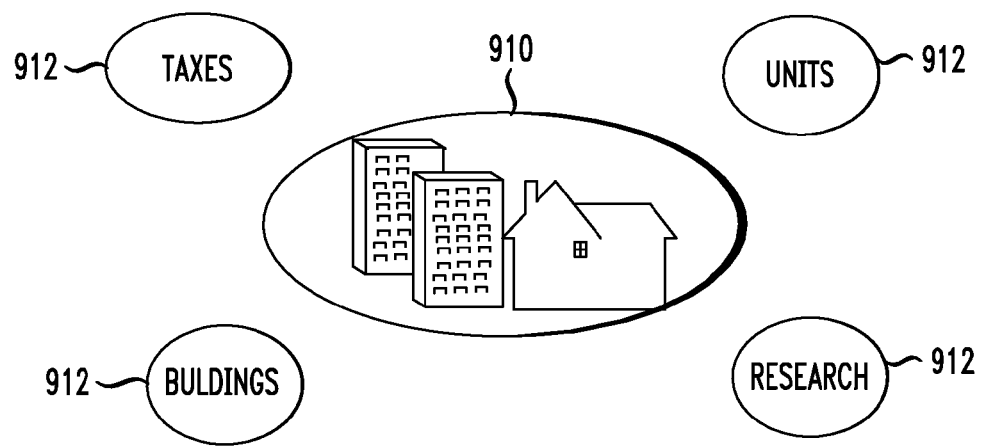

FIGS. 9A and 9B illustrate the use of particle-based user interfaces in video games. FIG. 9A shows a user's character 906. The user can then direct that character 906 to a new location 902 by an appropriate input device, the path the character will travel being the dashed line 908. The user can also task the character with a job upon arriving at the location designated 902, the jobs being presented as options 904 such as Attack, Defend, Scout, and Rest. FIG. 9B shows a similar particle-based user interface for video games, this time for a city strategy game. Here the user has selected a city 910, and is presented options 912 immediately around the selected city 910.

Having disclosed some basic system components and concepts, the disclosure now turns to the exemplary method embodiment shown in FIG. 10. For the sake of clarity, the method is discussed in terms of an exemplary system 100 as shown in FIG. 1A configured to practice the method. The steps outlined herein are exemplary and can be implemented in any combination thereof, including combinations that exclude, add, or modify certain steps.

Statistics are stored associated with a user interface (1002). These statistics can be comprehensive information about usage rates, similarities, user preferences, or can be as simple as probability statistics between different options. An example of probability statistics could be that 'Play' and 'Pause' are often presented together. Rules are then created for governing a particle based user interface based at least in part on the statistics. The particle-based user interface can be a graphical user interface in which user selectable options are dynamically displayed with respect to one another and user input (1004). In certain embodiments, the dynamic link to user input can be limited to the user selecting an option, whereas in other embodiments this dynamic link can modify the options in part based on the user input. For example, if the user input moves closer to an option it can increase in size, whereas options located further away from the user input may shrink. In another example, those options located further away from the user input may become more transparent while those options close to the user input become more opaque.

The system 100 then displays a first option to a user as part of the particle-based user interface, the first option positioned with respect to input received from the user and with respect to a second option (1006). Embodiments of this display can be in standard two and three dimensional representations, or can add in alternate dimensions based on sound, color, or transparency levels. The options displayed can be grouped such that sub-categories are grouped together, and can surround the main option from which they are sub-categories. Input from the user can include mouse, trackball, touch screen, photo-capture, motion-capture, voice input, or vision tracking. In some embodiments, there can be multiple input points or devices used. As the user interacts with the particle-based user interface, the system 100 records usage statistics and allows the particle-based user interface to iteratively better itself.

Embodiments within the scope of the present disclosure can also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any user interface where options are presented in a dynamic manner. Those skilled in the art will readily recognize various modifications and changes that may be made to the principles described herein without following the example embodiments and applications illustrated and described herein, and without departing from the spirit and scope of the disclosure.

We claim:

1. A method comprising:
a processor emulating, by a particle-based graphical user interface a non-particle-based graphical user interface, wherein the processor causes the particle-based graphical user interface to emulate the non-particle-based graphical user interface by applying a first set of rules defining graphical elements as rigidly positioned graphical user interface elements;
over a period of time while the particle-based graphical user interface emulates the non-particle-based graphical user interface, collecting, by the processor, statistical trends of interactions associated with what graphical elements a user selects, when the user selects the graphical elements, cursor location prior to the user making a selection, or order of user selection of the graphical elements within the particle-based graphical user interface;
based on the statistical trends, creating, by the processor, a second set of rules defining the graphical elements as non-rigidly positioned graphical elements to aid the user in selecting one of the graphical elements, wherein the first and second sets of rules are different from each other; and
after the period of time and via the processor, implementing the second set of rules which cause the graphical elements to be modeled as particles and move with respect to one another and a user input according to a selected physics model, each of the particles configured to exert a force on one another according to the selected physics model.

2. The method of claim 1, wherein the first and second sets of rules animate graphical elements by a computing graphical element location for each frame of plural frames sequentially displayed to render the particle-based graphical user interface and further comprising receiving the user input, wherein the user input is received via one of a mouse, a touch screen, a touchpad, a keyboard, a camera, a photo-capture device, a voice-input device, a motion capture device, a system state, a device state, a sensor, or an external event.

3. The method of claim 1, wherein the first and second sets of rules define, according to the selected physics model, graphical element behavior and inter-relationships between graphical elements and wherein the particle-based graphical user interface arranges the graphical elements having a layout in one of two dimensions, three dimensions, or four dimensions.

4. The method of claim 1, wherein different users have differing first and second sets of rules based on differing user behaviors during the period of time and wherein the graphical elements are grouped according to one of purpose, relevance, utility, popularity, user interactions, predicted user intent, or the statistical trends.

5. The method of claim 1, wherein, according to the first and second sets of rules, a location of a selected graphical element is computed based on a corresponding velocity, the velocity being computed by modeling gravity, attractions to other particles, collisions, and springs and further comprising:
receiving an additional user input; and
updating a first graphical element and a second graphical element based on the additional user input.

6. The method of claim 5, wherein updating the first graphical element and the second graphical element comprises redetermining a position of the first graphical element and redetermining a spacing between the first graphical element and the second graphical element.

7. The method of claim 1, wherein, according to the first and second sets of rules, a location of a selected graphical element is computed based on a corresponding velocity, the velocity being computed by modeling gravity, attractions to other particles, collisions, and springs and further comprising:
receiving a selection of one of a first graphical element and a second graphical element; and
updating the statistical trends based on the selection.

8. The method of claim 1, wherein the particle-based graphical user interface controls one of a smartphone, a television, a computing device, a gaming console, a heads-up display, a display having graphical overlay planes, or a document editing program.

9. The method of claim 1, further comprising:
modifying the placement of the graphical elements based on the statistical trends to yield a modified placement of the graphical elements; and
updating the statistical trends based on additional statistical information collected in association with the modified placement of the graphical elements.

10. The method of claim 1, further comprising forming an option flow to a first graphical element by linking a subset of graphical elements to the first graphical element.

11. The method of claim 1, wherein different users have differing first and second sets of rules based on differing user behaviors during the period of time and wherein collecting the statistical trends further comprises:
recording information about one of (i) which of the graphical elements the user selects, (ii) when the user makes a selection of a user-selectable option, (iii) a cursor location prior to making the selection, and (iv) an order of the selection.

12. The method of claim 11, wherein different users have differing first and second sets of rules based on differing user behaviors during the period of time and wherein the statistical trends further comprise data associated with a collective of users.

13. A system comprising:
a processor; and
a computer-readable storage medium storing instructions which, when executed by the processor, cause the processor to perform operations comprising:
emulating, by a particle-based graphical user interface a non-particle based graphical user interface, wherein the processor causes the particle-based graphical user interface to emulate the non-particle based graphical user interface by applying a first set of rules defining graphical elements as rigidly positioned graphical user interface elements;
over a period of time while the particle-based graphical user interface emulates the non-particle based graphical user interface, storing statistical trends of interactions associated with what graphical elements a user selects, when the user selects the graphical elements, cursor location prior to the user making the selection, or order of user selection of the graphical elements within the particle-based graphical user interface;
based on the statistical trends, creating a second set of rules defining the graphical elements as non-rigidly positioned graphical elements to aid the user in selecting one of the graphical elements, wherein the first and second sets of rules are different from each other; and
after the period of time, implementing the second set of rules which cause the graphical elements to be modeled as particles and move with respect to one another and a user input according to a selected physics model, each of the particles configured to exert a force on one another according to the selected physics model.

14. The system of claim 13, wherein the first and second sets of rules animate graphical elements by computing a graphical element location for each frame of plural frames sequentially displayed to render the particle-based graphical user interface and wherein the graphical elements move further with respect to the user input.

15. The system of claim 13, wherein different users have differing first and second sets of rules based on differing user behaviors during the period of time, wherein the first and second sets of rules define, according to the selected physics model, graphical element behavior and inter-relationships between graphical elements and wherein creating the second set of rules further comprises displaying the graphical elements with one of a two-dimensional representation, a three-dimensional representation, or a four-dimensional representation.

16. The system of claim 13, wherein, according to the first and second sets of rules, a location of a selected graphical element is computed based on a corresponding velocity, the velocity being computed by modeling gravity, attractions to other particles, collisions, and springs and wherein the user input is received from one of a mouse, a touch screen, a touchpad, a keyboard, a camera, a photo capture device, a voice-input device, or a motion capture device.

17. A system comprising:
a processor; and
a computer-readable storage medium storing instructions which, when executed by the processor, program the processor to:
emulate, by a particle-based graphical user interface a non-particle based graphical user interface, wherein the processor causes the particle-based graphical user interface to emulate the non-particle based graphical user interface by applying a first set of rules defining graphical elements as rigidly positioned graphical user interface elements;
over a period of time while the particle-based graphical user interface emulates the non-particle-based graphical user interface, store statistical trends of interactions associated with what graphical elements a user selects, when the user selects the graphical elements, cursor location prior to the user making the selection, or order of user selection of the graphical elements within the particle-based graphical user interface;
based on the statistical trends, create a second set of rules defining the graphical elements as non-rigidly positioned graphical elements to aid the user in selecting one of the graphical elements, wherein the first and second sets of rules are different from each other; and
after the period of time, implement the second set of rules which cause the graphical elements to be modeled as particles and move with respect to one another and a user input according to a selected physics model, each of the particles configured to exert a force on one another according to the selected physics model, wherein the first and second sets of rules animate graphical elements by a computing graphical element location for each frame of plural frames sequentially displayed to render the particle-based graphical user interface.

18. The system of claim 17, wherein different users have differing first and second sets of rules based on differing user behaviors during the period of time and wherein the graphical elements move further with respect to the user input.

19. The system of claim 17, wherein different users have differing first and second sets of rules based on differing user behaviors during the period of time, wherein the first and second sets of rules define, according to the selected physics model, graphical element behavior and inter-relationships between graphical elements and wherein creating the second set of rules further comprises displaying the graphical elements with one of a two-dimensional representation, a three-dimensional representation, or a four-dimensional representation.

20. The system of claim 17, wherein, according to the first and second sets of rules, a location of a selected graphical element is computed based on a corresponding velocity, the velocity being computed by modeling gravity, attractions to other particles, collisions, and springs and wherein the user input is received from one of a mouse, a touch screen, a touchpad, a keyboard, a camera, a photo capture device, a voice-input device, or a motion capture device.

* * * * *